United States Patent Office 3,698,982
Patented Oct. 17, 1972

3,698,982
METHOD FOR BONDING CURED SILOXANE RESIN SURFACES
Philip Alfred Griffin, Sully, Wales, assignor to Dow Corning Limited, London, England
No Drawing. Filed Oct. 22, 1970, Ser. No. 83,188
Claims priority, application Great Britain, Oct. 27, 1969, 52,576/69
Int. Cl. B32b 27/16, 27/26
U.S. Cl. 156—308                     5 Claims

ABSTRACT OF THE DISCLOSURE

Cured silicone resin surfaces, whether supported as on glass cloth or metal, or unsupported can be bonded together by applying to one or both of the cured silicone resin surfaces a known siloxane rearrangement catalyst having an activation and decomposition temperature below about 300° C., bringing the surfaces into intimate contact with each other with the rearrangement catalyst between the surfaces and heating the assembly to activate the rearrangement catalyst.

---

This invention relates to a method for bonding together cured organosiloxane resin surfaces.

It is often desired to form composite articles by bonding together cured organosiloxane resin surfaces. For example, it is known that organosiloxane resin-based laminates containing glass cloth or other reinforcing material can be bonded together employing siloxane-based pressure-sensitive adhesives. The bond obtained employing such adhesives is not, however, strong enough for many purposes and there has consequently existed a need for an improved method of bonding together the surfaces of cured organosiloxane resins.

According to this invention, there is provided a process for bonding a cured organosiloxane resin surface to another cured organosiloxane resin surface which comprises applying to at least one of the surfaces to be bonded a siloxane rearrangement catalyst having a decomposition temperature below 300° C. bringing the surfaces into contact and, thereafter, raising the temperature of the surfaces to at least that at which the siloxane rearrangement catalyst is activated.

The invention also includes a composite article which is the product obtained when two or more organosiloxane resin surfaces are bonded to each other according to the process.

The surfaces of any cured organosiloxane resin can be bonded together according to the process of this invention. Thus, the organosiloxane resins can be those in which the organic substituents are any monovalent hydrocarbon or substituted hydrocarbon radicals, for example, alkyl radicals, e.g., methyl, ethyl, octyl and octadecyl, cycloalkyl radicals, e.g., cyclohexyl and cyclooctadecyl, aryl radicals, e.g., phenyl and diphenyl, halogenoalkyl radicals and halogenoaryl radicals, e.g., bromomethyl, chlorophenyl and 3,3,3-trifluoropropyl and cyanoalkyl radicals, e.g., gamma-cyanopropyl. Most commercially available organosiloxane resins are those containing from 1.0 to 1.8 methyl radicals, phenyl radicals or mixtures of methyl and phenyl radicals, per silicon atom and this invention will, thus, normally find application in connection with the bonding of resins of this type.

The resin surfaces to be bonded can be of the same or different organosiloxane resins and the resin can be supported or unsupported. The resin can be supported, for example, on a solid metal, fabric, glass or plastic substrate or the resin can take the form of a cured, solid, unsupported mass or film. Of particular interest is the application of the invention in the bonding together of organosiloxane resin molded or laminated articles as, for example, in the manufacture of sandwich-type printed circuits. In such structures, the perforated, metal circuit layer is contained between two rigid glass fiber-reinforced organosiloxane resin laminates which are bonded together through the perforations in the metal layer. The process is also applicable to the bonding of a metal or metal foil, e.g. copper foil to a siloxane resin-glass fiber laminate. When a metal foil is to be bonded to a laminate, the surface of the foil which is to be bonded is first provided with a cured organosiloxane resin coating.

As employed herein, the term "cured" means that the organosiloxane resin has been converted to a solid, non-tacky condition. This condition can be achieved in an organosiloxane resin at some stage short of full cure. The term "cured resins" as used herein, therefore, includes partially cured resins provided the resin has reached the solid, non-tacky condition. In some cases, particularly where it is desired to bond together siloxane-glass laminates, the surface of the laminate can be deficient in the siloxane resin, for example, because of the presence of glass or other reinforcement at, or very close to, the resin surface. Where such conditions exist, it is preferred to make up the deficiency of resin by applying to the surface a coating of an organosiloxane resin which is then cured, or partially cured, prior to the application of the rearrangement catalyst.

Any siloxane rearrangement catalyst which decomposes below 300° C. is effective in the process of this invention. A variety of materials which function to catalyze siloxane bond rearrangement and which decompose below 300° C. are known in the art, including, for example, the quaternary ammonium and quaternary phosphonium hydroxides and alkoxides. These quaternary ammonium compounds can be represented by the formulae $R_4NOR'$ and $R_4POR'$ wherein each R represents an organic radical, for example, an alkyl radical, e.g., methyl, ethyl, propyl, octyl or dodecyl, a substituted alkyl radical, e.g., hydroxyethyl or hydroxypropyl, a cycloalkyl radical, e.g., cyclohexyl or an aryl, aralkyl or alkaryl radical, e.g., phenyl, tolyl, benzyl or phenylethyl and R' represents hydrogen or an alkyl radical, e.g., methyl, ethyl or butyl. Specific examples of such compounds are tetramethylammonium hydroxide, benzyltrimethylammonium hydroxide, tetrabutylphosphonium hydroxide and beta-hydroxylethylphosphonium ethoxide. Also operative and more preferred as catalysts herein are the organosilicon salts of such hydroxides and alkoxides, that is, the quaternary ammonium and quaternary phosphonium silanolates and siloxanolates. Examples of these salts are the benzyl trimethylphosphonium salt of diphenylsilanediol, the tetramethylphosphonium salt of trimethylsilanol, the tetramethylammonium salt of $HO\{Si(CH_3)_2O\}_3H$, the benzyltrimethylammonium salt of $HO\{C_6H_5(CH_3)SiO\}_4H$ and the diphenyldidodecylammonium salt of ethylphenylsilanediol. Like the quaternary hydroxides and alkoxides, these quaternary salts of organosilicon compounds and their use as siloxane rearrangement catalysts are well known.

They can be prepared, for example, by the reaction of a quaternary ammonium or quaternary phosphonium hydroxide or alkoxide with an organosilane or an organosiloxane. The preferred rearrangement catalysts for use in this invention are the quaternary ammonium silanolates and the quaternary ammonium siloxanolates.

The rearrangement catalyst is preferably applied to both surfaces to be bonded. However, provided sufficient of the rearrangement catalyst is employed, satisfactory bonding can be obtained when only one surface is treated. The catalyst is conveniently applied to the surface or surfaces in liquid form. Many of the quaternary compounds are liquids and can be applied as such or as a solution in a suitable organic solvent, for example, toluene, xylene or benzene. If the rearrangement catalyst is a solid, it can be applied to the surface as a fine powder, or more preferably, as a solution in an organic solvent.

Sufficient of the rearrangement catalyst should be applied to the resin surface to effect softening of the surface layer of the resin. The quantity employed in any particular bonding operation will depend on the resin and more particularly on the nature of the catalyst itself. Usually it is sufficient to apply to the surface a thin coating of the catalyst itself or of a concentrated solution of the catalyst.

When the rearrangement catalyst is present on one or both of the surfaces, they are brought together, preferably under pressure, and the temperature raised to that at which the rearrangement catalyst is activated. Normally such temperature will lie within the range from 75° to 150° C. Higher temperatures, for example, up to 250° C. can be used. However, it will be understood that the temperature should not be so high as to decompose or otherwise remove the catalyst prematurely.

The formation of a bond between the surfaces will commence with the activation of the rearrangement catalyst. To ensure maximum bond strength, however, the surfaces are best maintained at the elevated temperature for at least 5 minutes. To avoid reactivation of the catalyst during subsequent use of the bonded article at elevated temperatures, the catalyst is preferably removed during or following the bonding operation. Some decomposition of the catalyst will, in general, occur at the temperature at which the catalyst is activated. The surfaces can, therefore, be maintained at the temperature at which bonding takes place for a time sufficient to ensure substantially complete decomposition of the catalyst. Alternatively, the temperature can be raised to accelerate such decomposition when the desired bond has been attained. Such removal of the catalyst residue will avoid weakening of the bond during any subsequent exposure of the bonded article to elevated temperatures.

The following examples illustrate the invention.

EXAMPLE 1

Two glass cloth reinforced organosiloxane resin laminates of thickness 0.1 in. were prepared employing a methylphenylpolysiloxane resin having a phenyl to methyl ratio of 0.38/1 and a degree of substitution of 1.28/1. The laminates were subjected to a complete curing cycle after removal from the laminating press. One surface of each laminate was then coated with a 60% by weight solution in toluene of a resin prepared by the cohydrolysis and condensation of 65 mol percent of methyltrichlorosilane and 35 mol percent of phenyltrichlorosilane. The thickness of each of the applied resin coatings was 0.10 in.

The coatings were then heated to effect cure of the resin and when cool were brushed with a 50% by weight solution in toluene of a silanolate prepared by reacting 4 parts by weight of benzyltrimethylammonium hydroxide with 13 parts by weight of $\{C_6H_5(CH_3)SiO\}_4$.

The toluene was removed from the applied coatings by heating to 85° C. for 10 minutes and the treated surfaces then pressed together at 1000 p.s.i. at 140° C. for 1 hour, some overlap being allowed between the two laminates. When the laminates had cooled, they could not be separated manually when grasped at the overlapping portions.

EXAMPLE 2

Two completely cured pieces of a silica-filled organosiloxane molding compound (0.2 in. thick) were prepared employing as the resin binder a phenylmethylpolysiloxane having a phenyl to methyl ratio of 1.3/1 and a degree of substitution of 1.15/1. One surface of each piece was brushed with a 50% by weight solution in toluene of the silanolate used in Example 1. The toluene was removed from the applied coatings by heating to 85° C. for 10 minutes and the treated surfaces then pressed together at 1000 p.s.i. at 140° C. for 1 hour. When cool, the pieces of molding compound could not be separated manually.

EXAMPLE 3

A 50% solution of a flexible phenylmethylsiloxane resin (phenyl to methyl=0.8/1 and degree of substitution=1.47/1) in xylene was brushed on the chemically prepared surface of printed circuit grade copper foil and cured by heating at 140° C. for 1 hour. The surface of the resin layer was then coated with the quaternary silanolate solution employed in Example 1 and placed on the surface of a previously prepared silicone resin, glass-cloth laminate of the type used in Example 1. A pressure of 1000 p.s.i. was applied and the assembly heated to 140° C. for 1 hour. When the composite was cool, the copper foil was found to be bonded to the resin-glass laminate.

EXAMPLE 4

Equivalent results were achieved when Example 1 was repeated employing in place of the reactant of benzyltrimethylammonium hydroxide with phenylmethylcyclictetrasiloxane, an equivalent amount of each of the following was employed: tetramethylammonium methoxide, dimethylphenylhydroxypropylammonium hydroxide, dimethyldiethylphosphonium ethoxide, diphenyldioctylphosphonium hydroxide, benzyltrimethylammonium hydroxide, beta-hydroxyethyltriethylphosphonium ethoxide, the benzyltrimethylphosphonium salt of $$(C_6H_5)_2Si(OH)_2$$

the tetramethylphosphonium salt of $(CH_3)_3SiOH$, the tetramethylammonium salt of a hydroxyl end blocked dimethylsiloxane or phenylmethylsiloxane containing 3, 4 or 5 siloxane units per molecule, and the diphenyldidodecylammonium salt of ethylphenylsilanediol.

That which is claimed is:

1. A process for bonding a cured organosiloxane resin surface to another cured organosiloxane resin surface which comprises applying to at least one of the surfaces to be bonded a catalyst for the rearrangement of siloxane bonds, said catalyst being selected from the group consisting of quaternary ammonium hydroxides, quaternary ammonium alkoxides, quaternary phosphonium hydroxides, quaternary phosphonium alkoxides, organosilicon salts of the foregoing and mixtures thereof, said catalyst having an activation temperature in the range from 75° to 250° C., bringing the surfaces into contact and, thereafter, raising the temperature of the surfaces to at least that at which the rearrangement catalyst is activated.

2. A process as claimed in claim 1 wherein the cured organosiloxane resins have from 1.0 to 1.8 methyl and/or phenyl radicals per silicon atom.

3. A process as claimed in claim 1 wherein the rearrangement catalyst is a quaternary ammonium silanolate or a quaternary ammonium siloxanolate or a mixture thereof.

4. A process as claimed in claim 1 wherein the surfaces to be bonded are the surfaces of glass fiber-reinforced organosiloxane resin laminates.

5. A process as claimed in claim 1 wherein one surface to be bonded is the surface of a glass fiber-reinforced organosiloxane resin laminate and the other is the surface of a metal foil having thereon a coating of at least partially cured organosiloxane resin.

References Cited

UNITED STATES PATENTS

| | | | |
|---|---|---|---|
| 3,503,925 | 3/1970 | Griffin | 161—193 X |
| 3,414,463 | 12/1968 | Jasinski | 161—193 X |
| 3,567,493 | 3/1971 | Wessel | 156—308 X |
| 3,056,735 | 10/1962 | Smith-Johannsen | 156—329 X |
| 3,061,567 | 10/1962 | Keil | 156—329 X |
| 3,108,898 | 10/1963 | Nitsche et al. | 156—329 X |
| 3,146,799 | 9/1964 | Fekete | 156—329 X |
| 3,379,607 | 4/1968 | Foster et al. | 156—329 X |
| 3,477,901 | 11/1969 | Keil | 156—329 X |
| 3,492,193 | 1/1970 | Tesoro | 161—193 X |
| 3,520,948 | 7/1970 | Cuthill | 156—329 X |
| 3,619,323 | 11/1971 | Stebleton | 156—329 X |

HAROLD ANSHER, Primary Examiner

U.S. Cl. X.R.

156—305, 329; 161—188, 193, 207